US008408188B1

(12) United States Patent
Hormilla

(10) Patent No.: US 8,408,188 B1

(45) Date of Patent: Apr. 2, 2013

(54) ENGINE ACCESSORY BELT DRIVE PULLEY

(75) Inventor: Maxwell Hormilla, Cranford, NJ (US)

(73) Assignee: Hormilla Performance Engineering LLC, Cranford, NJ (US)

( * ) Notice: Subject to any disclaimer, the term of this patent is extended or adjusted under 35 U.S.C. 154(b) by 544 days.

(21) Appl. No.: 12/637,382

(22) Filed: Dec. 14, 2009

Related U.S. Application Data

(60) Provisional application No. 61/122,289, filed on Dec. 12, 2008.

(51) Int. Cl.

| | |
|---|---|
| ***F02B 33/00*** | (2006.01) |
| ***F02B 61/04*** | (2006.01) |
| ***F02B 67/06*** | (2006.01) |
| ***F02B 77/08*** | (2006.01) |
| ***F16H 59/00*** | (2006.01) |
| ***F16H 61/00*** | (2006.01) |
| ***F16H 63/00*** | (2006.01) |
| ***F16H 55/36*** | (2006.01) |
| ***F16G 5/00*** | (2006.01) |

(52) U.S. Cl. ............. 123/559.1; 123/198 R; 123/195 A; 474/49; 474/69; 474/74; 474/166; 474/238

(58) Field of Classification Search ............... 123/559.1, 123/195 A, 198 R; 474/69, 70, 74, 84, 85, 474/88, 113, 133, 135, 137, 161, 166, 168, 474/190, 238, 270–271, 903

See application file for complete search history.

(56) References Cited

U.S. PATENT DOCUMENTS

| | | | | | |
|---|---|---|---|---|---|
| 2,903,083 | A * | 9/1959 | Kelley | | 477/34 |
| 3,763,715 | A * | 10/1973 | Pollard et al. | | 474/137 |
| 4,028,955 | A * | 6/1977 | Fisher et al. | | 474/87 |
| 4,215,658 | A * | 8/1980 | Smith et al. | | 123/195 A |
| 4,502,345 | A * | 3/1985 | Butterfield | | 123/198 R |
| 4,854,921 | A * | 8/1989 | Kumm | | 474/49 |
| 4,969,857 | A * | 11/1990 | Kumm | | 474/49 |
| 5,065,713 | A * | 11/1991 | Seats | | 123/195 A |
| 5,085,199 | A * | 2/1992 | Sado et al. | | 123/559.1 |
| 5,112,281 | A * | 5/1992 | Minato et al. | | 474/84 |
| 5,176,581 | A * | 1/1993 | Kumm | | 474/110 |
| 5,197,423 | A * | 3/1993 | Ebesu et al. | | 123/195 A |
| 5,197,427 | A * | 3/1993 | Masuda et al. | | 123/198 R |
| 5,216,989 | A * | 6/1993 | Iwata et al. | | 123/198 R |
| 5,224,459 | A * | 7/1993 | Middlebrook | | 123/559.1 |
| 5,334,107 | A * | 8/1994 | White, Jr. | | 474/238 |
| 5,342,248 | A * | 8/1994 | Matsubara et al. | | 474/69 |
| 5,415,592 | A * | 5/1995 | Hoyt | | 474/85 |
| 5,423,304 | A * | 6/1995 | Lawrence et al. | | 123/559.1 |
| 5,700,212 | A * | 12/1997 | Meckstroth | | 474/70 |
| 5,704,862 | A * | 1/1998 | Janne et al. | | 474/168 |
| 5,722,909 | A * | 3/1998 | Thomey | | 474/89 |
| 5,851,635 | A * | 12/1998 | Di Giacomo et al. | | 428/167 |
| 5,931,755 | A * | 8/1999 | Mailey et al. | | 474/903 |
| 5,971,721 | A * | 10/1999 | Carstensen | | 474/141 |
| 6,082,340 | A * | 7/2000 | Heimark | | 123/559.1 |

(Continued)

FOREIGN PATENT DOCUMENTS

| | | | |
|---|---|---|---|
| DE | 3825091 | A1 * | 1/1990 |
| GB | 2030192 | A * | 4/1980 |

*Primary Examiner* — Thai Ba Trieu

(74) *Attorney, Agent, or Firm* — Mayer & Williams PC

(57) ABSTRACT

A belt drive pulley system termed a "flip drive" is configured to provide at least two belt drive pulleys that are co-axially and integrally arranged and share common axle/bearing and mounting components. By being co-axially disposed, the belt drive pulleys will operate in separate and distinct planes. The flip drive is adapted for use in various applications so that power received on its first pulley from a first belt drive is transferred from its second pulley to a second belt drive (where the first and second belt drives are not co-planar).

5 Claims, 10 Drawing Sheets

U.S. PATENT DOCUMENTS 6,361,457 B1 * 3/2002 May et al. ........................ 474/32
6,619,275 B2 * 9/2003 Wiik .......................... 123/559.1
7,216,621 B2 * 5/2007 Pigott et al. ............... 123/195 A
7,281,528 B2 * 10/2007 Jones et al. ................ 123/559.1
7,485,059 B2 * 2/2009 Fadler et al. .................. 474/166
7,591,254 B2 * 9/2009 Machner .................... 123/559.1
7,717,080 B1 * 5/2010 Grozich .................... 123/195 A
7,798,928 B2 * 9/2010 Serkh .............................. 474/70
8,028,671 B1 * 10/2011 Grozich .................... 123/195 A
8,092,326 B2 * 1/2012 Amanuma et al. .............. 474/74
2002/0039944 A1 * 4/2002 Ali et al. ........................ 474/135
2002/0182063 A1 * 12/2002 Edsinger .................... 123/559.1
2004/0178398 A1 * 9/2004 Miller et al. .................. 474/166
2008/0110683 A1 * 5/2008 Serkh ........................... 180/65.2
2008/0318729 A1 * 12/2008 Asao et al. ......................... 477/5
2009/0056134 A1 * 3/2009 Kleber et al. ................... 29/894
2012/0000446 A1 * 1/2012 Venton-Walters et al. 123/559.1

* cited by examiner

SC - supercharger
WP - water pump
CS - crankshaft
PS - power steering
A - Alternator
AC - Air conditioning
I - Idler

ENGINE ACCESSORY BELT DRIVE PULLEY

STATEMENT OF RELATED APPLICATION

This application claims the benefit of U.S. Provisional Patent Application Ser. No. 61/122,289, filed Dec. 12, 2008, entitled "Engine Accessory Belt Drive Pulley", the disclosure of which is incorporated by reference with the same effect as if set forth at length herein.

BACKGROUND

Superchargers can be used to significantly increase the horsepower ("HP") and torque produced by an internal combustion engine through forced induction which boosts the mass flow rate of air to support combustion over what would normally be available through conventional or natural aspiration. Superchargers can take a variety of forms including positive displacement (e.g., roots-type and screw-type) and dynamic compressors (e.g., centrifugal), but all types are essentially pumps which need to be driven to produce the desired increase in power output. The amount of engine power consumed by the supercharger, termed "parasitic loss" can be significant especially in high boost applications.

Superchargers can be driven by a variety of means but are typically driven by the supercharged engine itself through a mechanical coupling such as a belt, gear, shaft, or chain. For example, the commonly-utilized and popular centrifugal supercharger is often belt driven, particularly in after-market applications where relatively straightforward modifications to the existing engine belt drive system can be made to accommodate the supercharger installation. For example, the serpentine belt drive used to provide input power from the crankshaft pulley to existing engine accessories such as the water pump, air conditioning compressor, alternator, power steering pump, etc., can typically be adapted to enable a belt to be routed to the supercharger input pulley.

Such belt drive adaptations can provide satisfactory performance results in some cases while minimizing the engineering expense and installation complexity that would be expected to accompany other drive systems. However, sharing the same belt between the supercharger and other engine accessories can be problematic in high boost/power applications where the parasitic supercharger loss can be high. In such cases, the engine may need to impart a large amount of power through the belt drive, for example 50 to 100 HP or more, which is far in excess of the loads the system was originally designed to bear. For example, the OEM (Original Equipment Manufacturer) components such as accessory brackets may emerge as a point of failure and present such problems as deflection under load that causes belt misalignment which reduces drive efficiency and can increase bearing load, or result in outright catastrophic failure in some cases. While replacement accessory brackets can be installed in an attempt to address this issue, such solutions can add expense and present additional installation complexity. The effectiveness of the solution can also be limited in many applications because space is typically at a premium due to the tight packaging of most modern engines.

Another problem with sharing the belt drive between the supercharger and engine accessories is posed by running the long serpentine belts that are typically necessary. Long belt paths tend to exacerbate problems with pulley alignment among the driven components and the long spans can also generate complex non-linear belt motions including vibration and resonance that can require additional components such as idlers and tensioners to be engineered and installed. Such components not only can add expense and installation complexity but may be restricted in their application in some cases because of the limited available space.

SUMMARY

A belt drive pulley system termed a "flip drive" is configured to provide at least two belt drive pulleys that are co-axially and mechanically coupled to simultaneously rotate about a common axis and which share components such as an axle/bearings and mounting bracket. By being co-axially disposed, the belt drive pulleys can interface with belt drives which operate in separate planes. The flip drive is adapted for use in various applications so that power received on its first pulley from a first belt drive is transferred from its second pulley to a second belt drive (where the first and second belt drives are not co-planar).

Advantageously, in an illustrative example, the flip drive enables separate belt drives to be utilized for a supercharger and engine accessories. This results in shorter and more direct belt paths and removes the accessories and their associated brackets as points of failure from the supercharger belt path to increase reliability of aftermarket supercharger installations, and enables the respective belt drives to be optimized for their respective uses. For example, the belt drive between the crankshaft and supercharger can increase the contact area (i.e., "wrap") between the belt and the supercharger pulley which can prevent belt slip.

BRIEF DESCRIPTION OF THE DRAWINGS

Like reference numerals indicate like elements in the drawings. Elements are not drawn to scale unless otherwise indicated.

DETAILED DESCRIPTION

Figure 1:
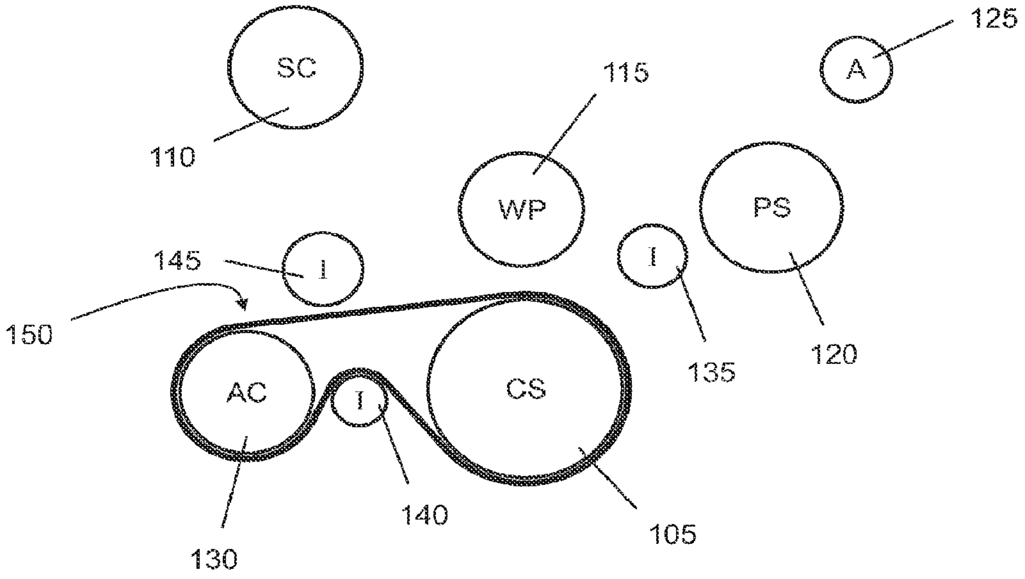
FIG. 1 PRIOR ART
FIG. 1 shows an illustrative example of a current implementation of belt routing in the proximal plane in a Chevrolet LS series V8 engine with an aftermarket supercharger.

In an illustrative engine embodiment, a first belt drive is driven by the engine crankshaft pulley and operates in a plane that is proximal to (i.e., closest to) the engine block. A second belt drive operates in a plane that is distal to (i.e., furthest from) the engine block and is driven by the second pulley in the flip drive to operate one or more engine accessories such as the alternator and power steering pump. Thus, the flip drive can take engine power from the first belt drive off the engine crankshaft and transfer it to a second belt drive to drive the engine accessories where the pulley on the crankshaft and the pulleys on the engine accessories are not co-planar. That is, the pulley on the crankshaft can be in the proximal plane while the pulleys on the engine accessories can be in the distal plane. In this embodiment, use of the flip drive will thus enable use of a third belt drive off a second crankshaft pulley (that is co-axial with the first crankshaft pulley but located in the distal plane) to drive the supercharger, along with the water pump in some implementations.

In an illustrative usage application, the flip drive can be adapted for use with the "V" configuration eight cylinder (i.e., "V8") Chevrolet engine such as the current "LS" series of all-aluminum engines that are used in vehicles manufactured and sold by General Motors. In this application, the flip drive is located on a mounting bracket so that when the bracket is attached to the LS engine, the axis of rotation of two co-axial pulleys in the flip drive is substantially parallel to the axis of rotation of the engine's crankshaft (i.e., the long axis of the vehicle in which the engine is mounted). The mounting bracket is then attached via 10 mm threaded fasteners to existing threaded openings in surfaces on the front portion of the engine block (where the front portion is the portion of the engine through which the end of the crankshaft opposite the flywheel or flex plate end is located). In the LS application in C5 and C6 (fifth and sixth generation) Corvettes, the mounting bracket positions the flip drive to the right and above the center of the crankshaft pulley when looking at the front of the engine, and below and to the left of the center of the power steering pump pulley.

The flip drive pulleys and mounting bracket may be fabricated from aluminum alloy such as 6061, for example, with T4 or T6 temper. The flip drive pulleys may be integrally formed as a unitary or monolithic piece and will typically be hard anodized to improve wear and belt handling characteristics. Alternatively, the flip drive pulleys may be formed from polymer or composite materials such a carbon fiber, or various combinations of materials. The surfaces of the pulley which contact the drive may also include circumferentially disposed inward radially disposed grooves to interface with corresponding ribs on the belt. However, in alternative embodiments v-type belts and corresponding pulley types may also be utilized.

In the LS Corvette implementation, the first belt drive in the proximal plane takes power off the first crankshaft pulley to drive the first flip drive pulley and the AC (air conditioner) compressor. The second belt drive in the distal plane takes power off the second flip drive pulley to drive the alternator and the power steering pump. The third belt drive in the distal plane takes power from the second crankshaft pulley to drive the supercharger (which is mounted towards the top left on the front of the engine) and the water pump.

FIG. 1 shows an illustrative example of a current implementation of belt routing in the proximal plane in a Chevrolet LS series V8 engine with an aftermarket supercharger. The drawing shows the pulleys associated with crankshaft 105, supercharger 110, water pump 115, power steering pump 120, alternator 125, AC compressor 130, as well as various idlers 135, 140, and 145. In alternative implementations, the idlers may also comprise those used with belt tensioners. (It is noted that the reference numerals used herein can refer to either the component itself or a pulley on the component which will be clear from the context).

The crankshaft 105 includes two pulleys that are arranged co-axially to drive two respective belt drives in each of the proximal and distal planes. A belt drive comprises a belt 150 that is routed to take power from the pulley on the crankshaft 105 in the proximal plane and drive the AC compressor 130. As shown, the idler 140 is utilized to provide increased wrap of the belt 150 on the pulleys of both the AC compressor 130 and crankshaft 105. In this particular example, the belt 150 is a 4-rib serpentine belt where the ribs interface with respective grooves in the pulleys and idlers.

Figure 2:
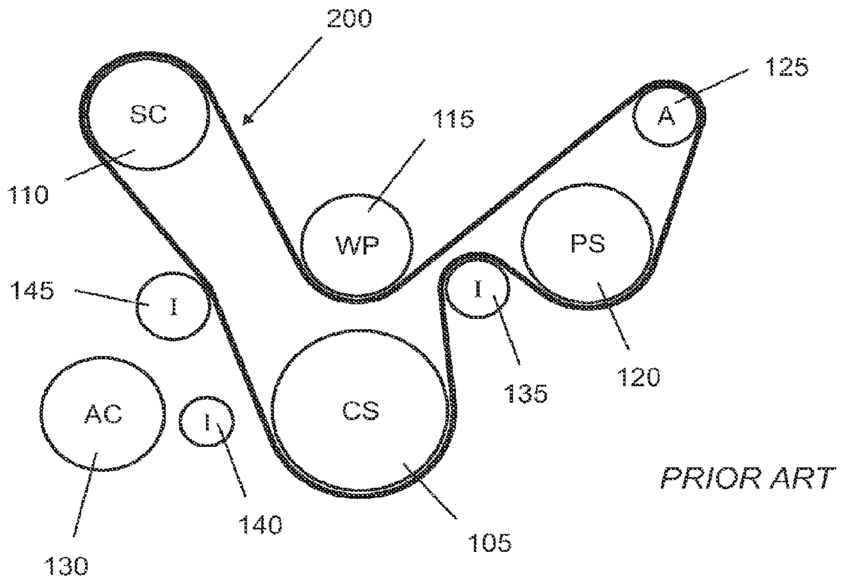
FIG. 2 shows an illustrative example of an existing implementation of belt routing in the distal plane in an LS series engine.

FIG. 2 shows an illustrative example of an existing implementation of belt routing in the distal plane in a LS series engine. Here, another belt drive operates in the distal plane in which a belt 200 takes power off the second pulley on the crankshaft 105 to drive the supercharger 110, water pump 115, alternator 125, and power steering pump 120 where the belt routing incorporates the idlers 135 and 145. In many applications, the back side (i.e., non-ribbed side) of the belt 200 will typically interface with the pulley on the water pump 115. In this particular illustrative example, the belt 200 is a 6-rib serpentine belt.

Figure 3:
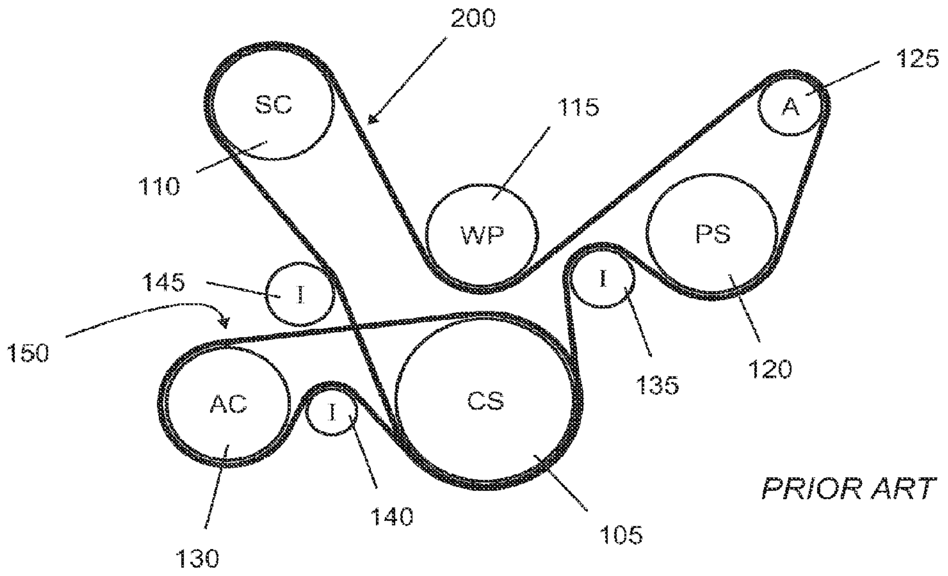
FIG. 3 shows the combined routing of the two belt drives in respective proximal and distal planes as used in the existing LS series supercharger application.

FIG. 3 shows the combined routing of the two belt drives in respective proximal and distal planes as used in the existing LS series supercharger application.

Figure 4:
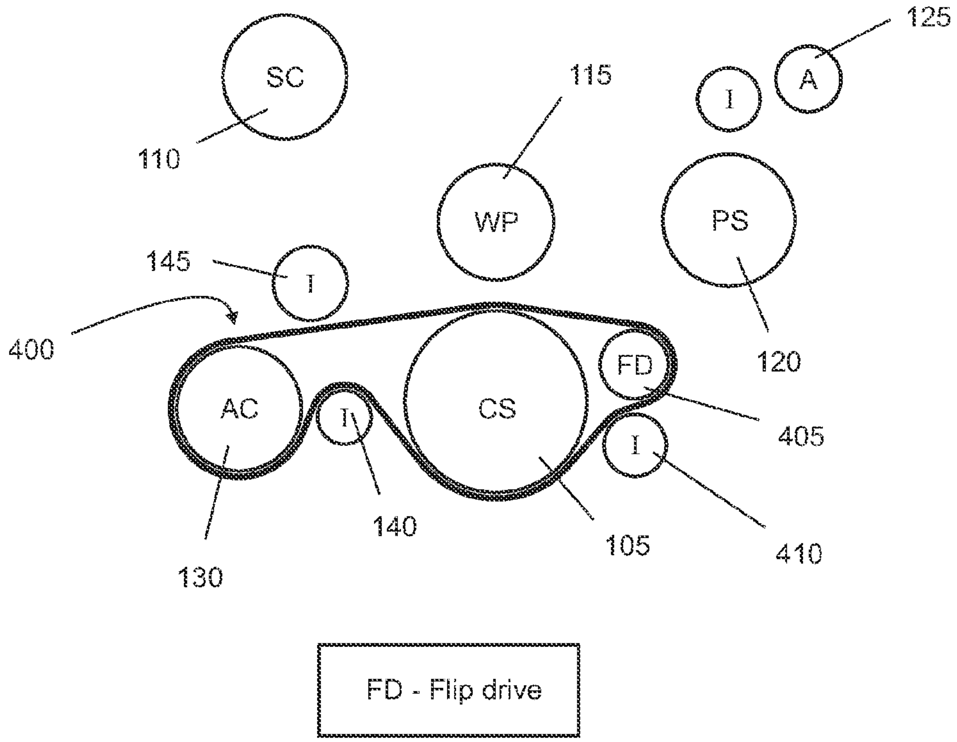
FIG. 4 shows an illustrative example of belt routing in the proximal plane in the LS series engine in which the present flip drive is utilized.

FIG. 4 shows an illustrative example of belt routing in the proximal plane in the LS series engine in which the first belt drive comprising a belt 400 takes power from the first pulley on the crankshaft 105 (in the proximal plane) and drives the flip drive 405 as well as the AC compressor 130. Belt 400 in this example is a 4-rib serpentine belt. An idler 410 is used in the path of the first belt drive to increase the wrap on both the crankshaft pulley and flip drive pulley in the proximal plane.

Figure 5:
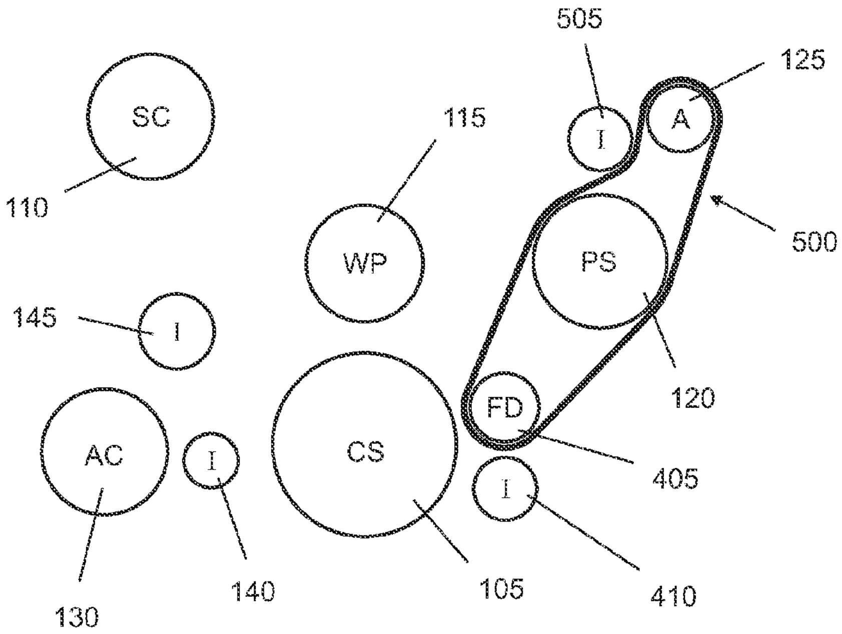
FIG. 5 shows an illustrative example of belt routing in the distal plane in the LS series engine in which the present flip drive is utilized.

FIG. 5 shows an illustrative example of belt routing in the distal plane in the LS series engine in which the second belt drive comprising a belt 500 takes power from the second flip drive pulley to drive the power steering pump 120 and alternator 125. An idler 505 is used to increase the belt wrap on the power steering pump pulley and alternator pulley. Belt 500 in this example is a 6-rib belt.

Figure 6:
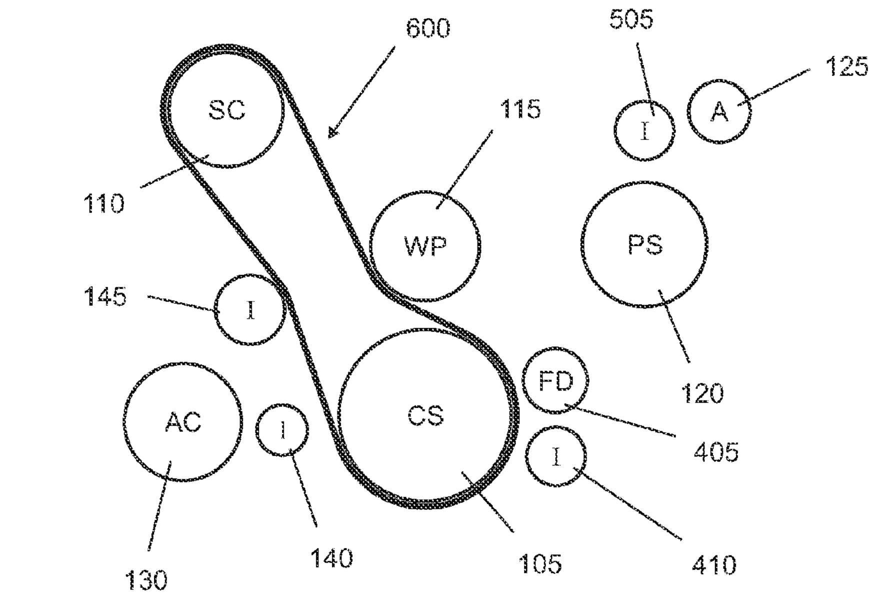
FIG. 6 shows an illustrative example of belt routing in the distal plane in the LS series engine in which a short belt path between the crankshaft pulley and supercharger pulley is advantageously enabled by use of the present flip drive.

FIG. 6 shows an illustrative example of belt routing in the distal plane in the LS series engine in which the third belt drive comprising belt 600 takes power from the second pulley on the crankshaft 105 (in the distal plane) to drive the water pump 115 (off its backside) and supercharger 110. The idler 145 is used to increase the belt wrap on the crankshaft pulley and supercharger pulley. Belt 600 in this example is a 6-rib belt.

Figure 7:
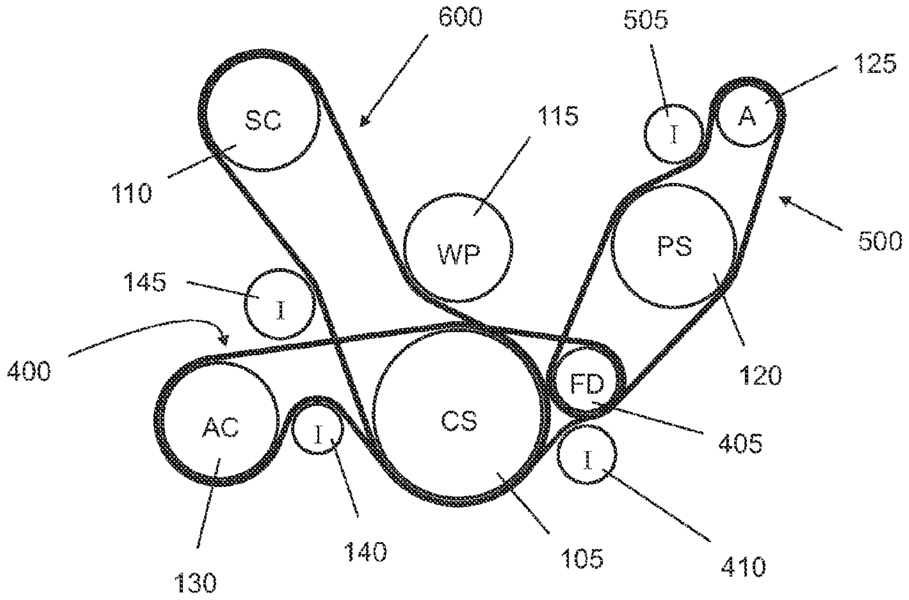
FIG. 7 shows the combined routing of the three belt drives in the LS series engine application in which the present flip drive is utilized.

FIG. 7 shows the combined routing of the three belt drives in the LS series engine application in which the flip drive 405 is utilized.

Figure 8:
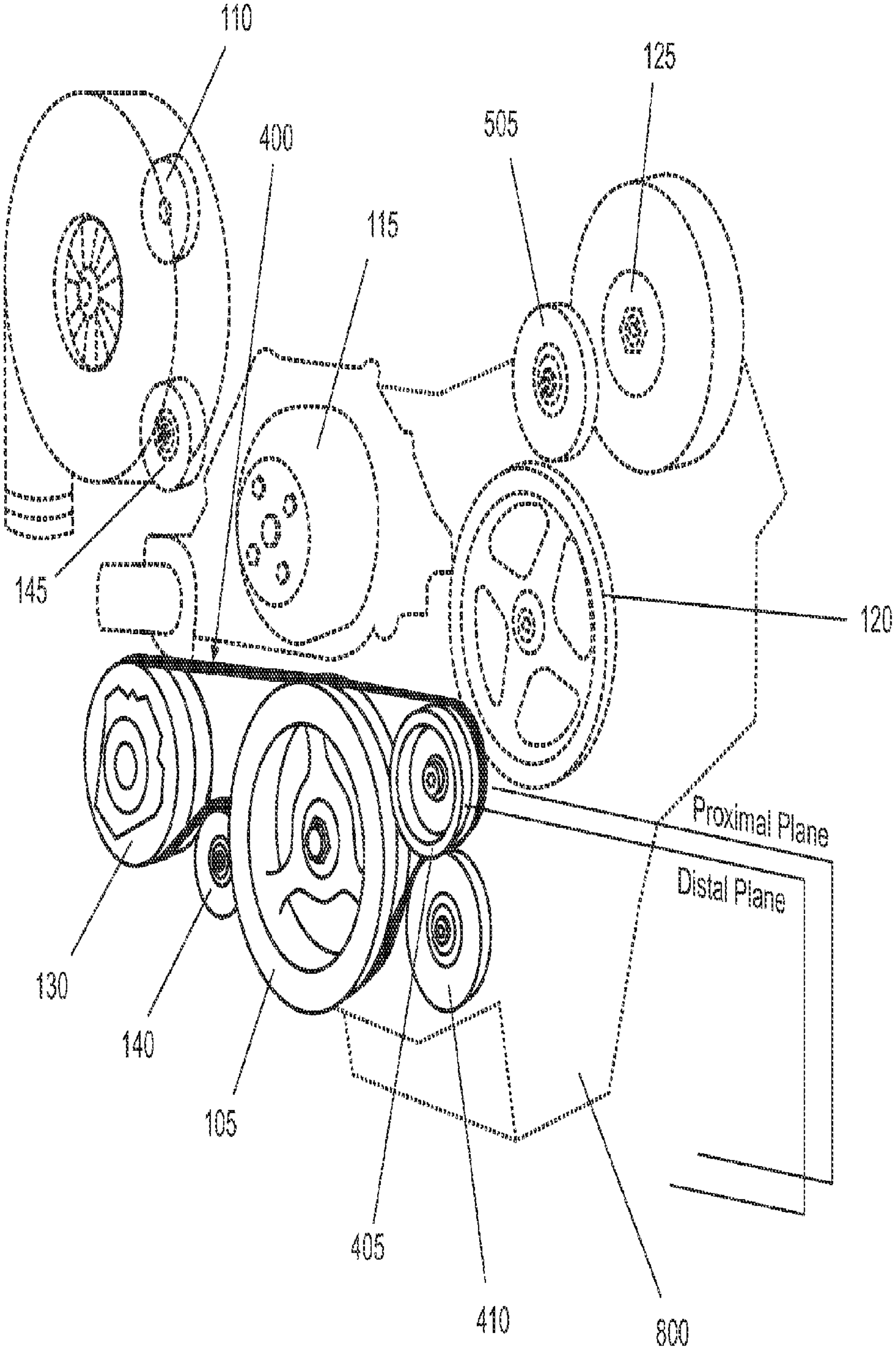
FIGS. 8-10 are various simplified pictorial views of the LS series engine with supercharger, various engine accessories, belt drives, idlers, and the present flip drive.
Figure 9:
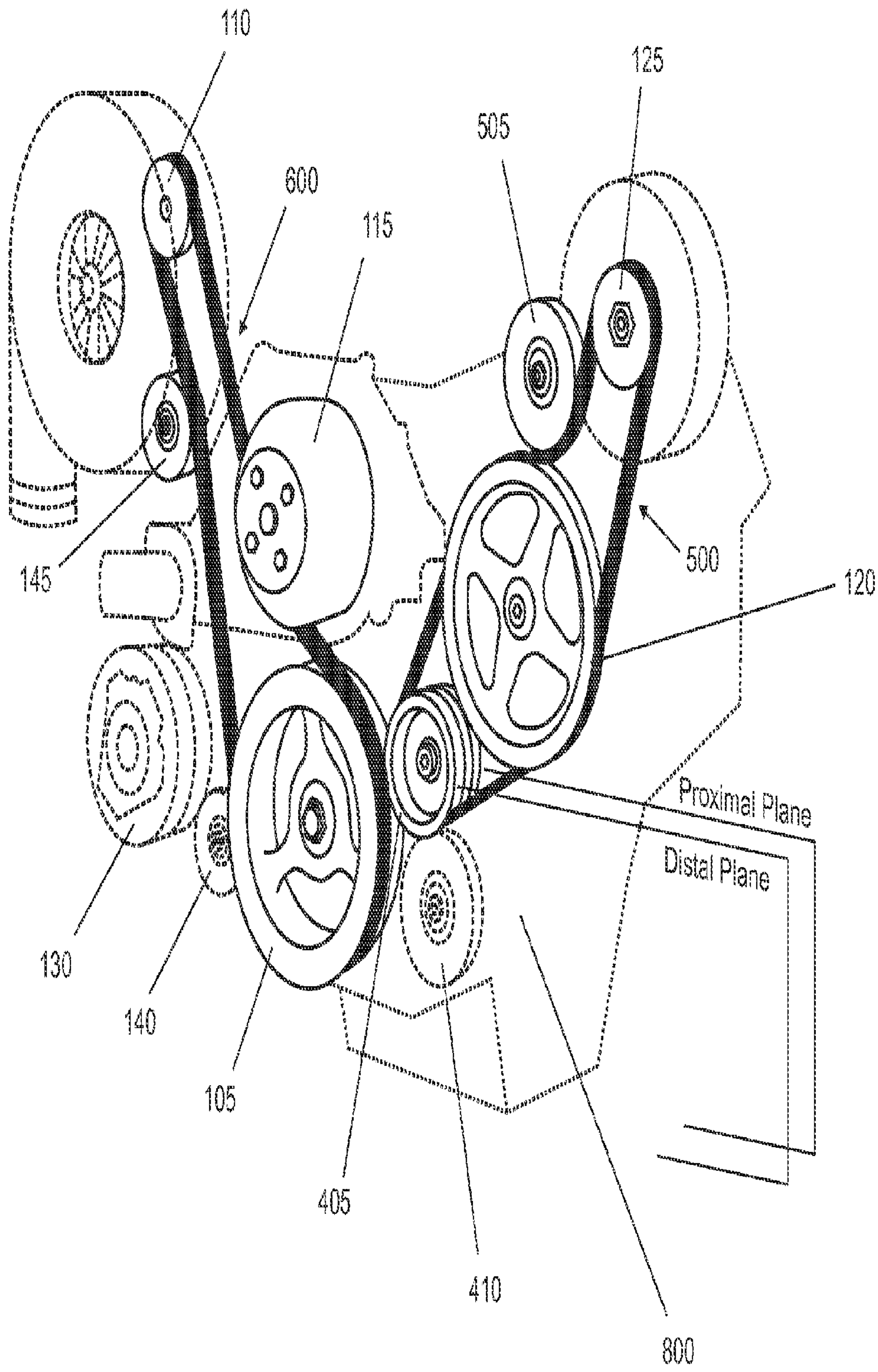
Figure 10:
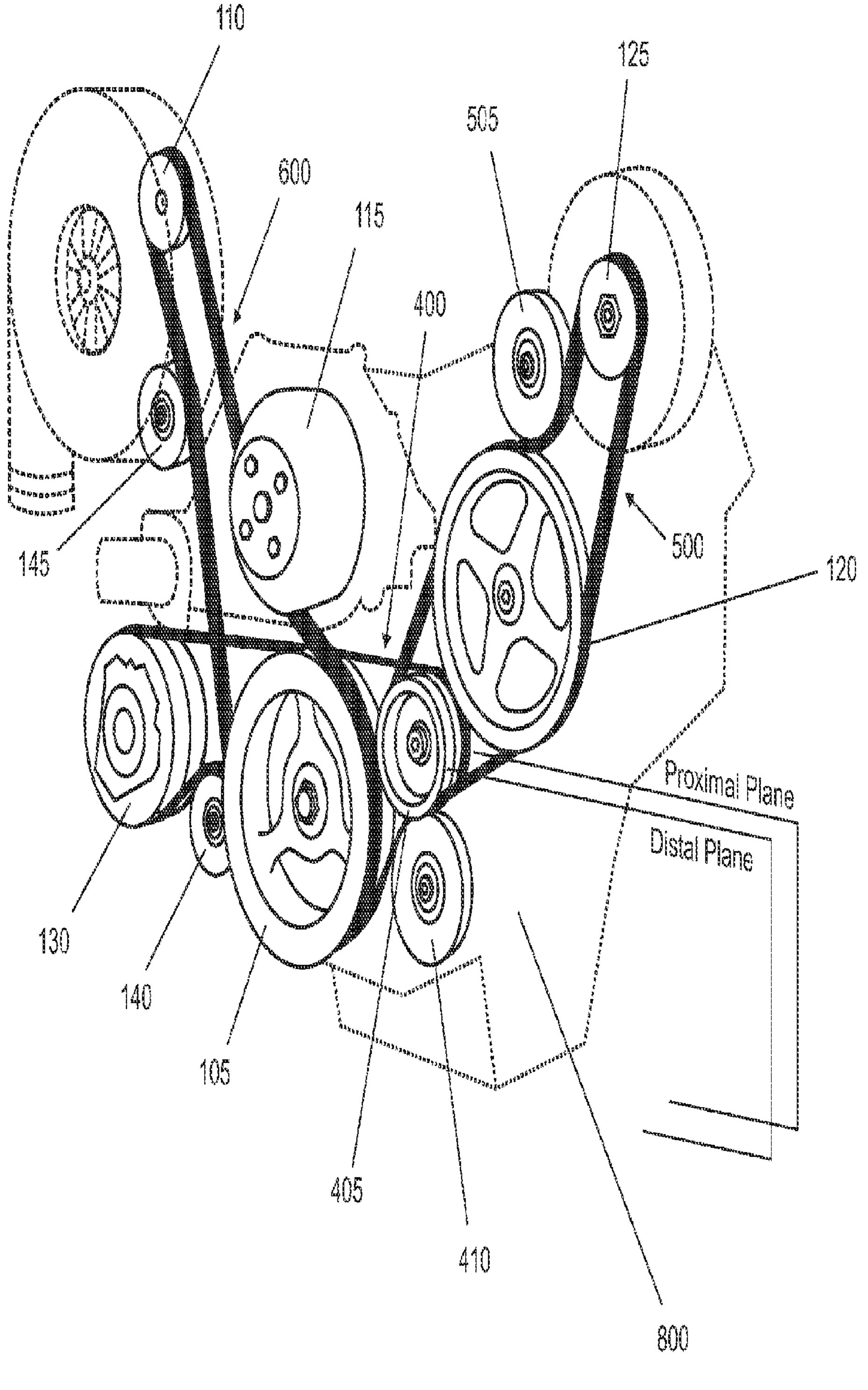

FIGS. 8-10 show various simplified pictorial views of the LS series engine with supercharger, various engine accessories, belt drives, idlers, and the present flip drive in relationship to the engine block 800. FIG. 8 shows a simplified pictorial view of the first belt drive in the proximal plane which comprises belt 400 which drives the flip drive 405 and AC compressor 130 from the crankshaft 105.

FIG. 9 shows a simplified pictorial view of the second and third belt drives in the distal plane. As shown, belt 500 in the distal plane takes power from the flip drive 405 to drive the power steering pump 120 and alternator 125. Belt 600 takes power from the distal pulley on the crankshaft 105 to drive the supercharger pulley 110.

FIG. 10 shows a simplified pictorial view of all three belt drives which respectively include belts 400, 500, and 600.

Figure 11:
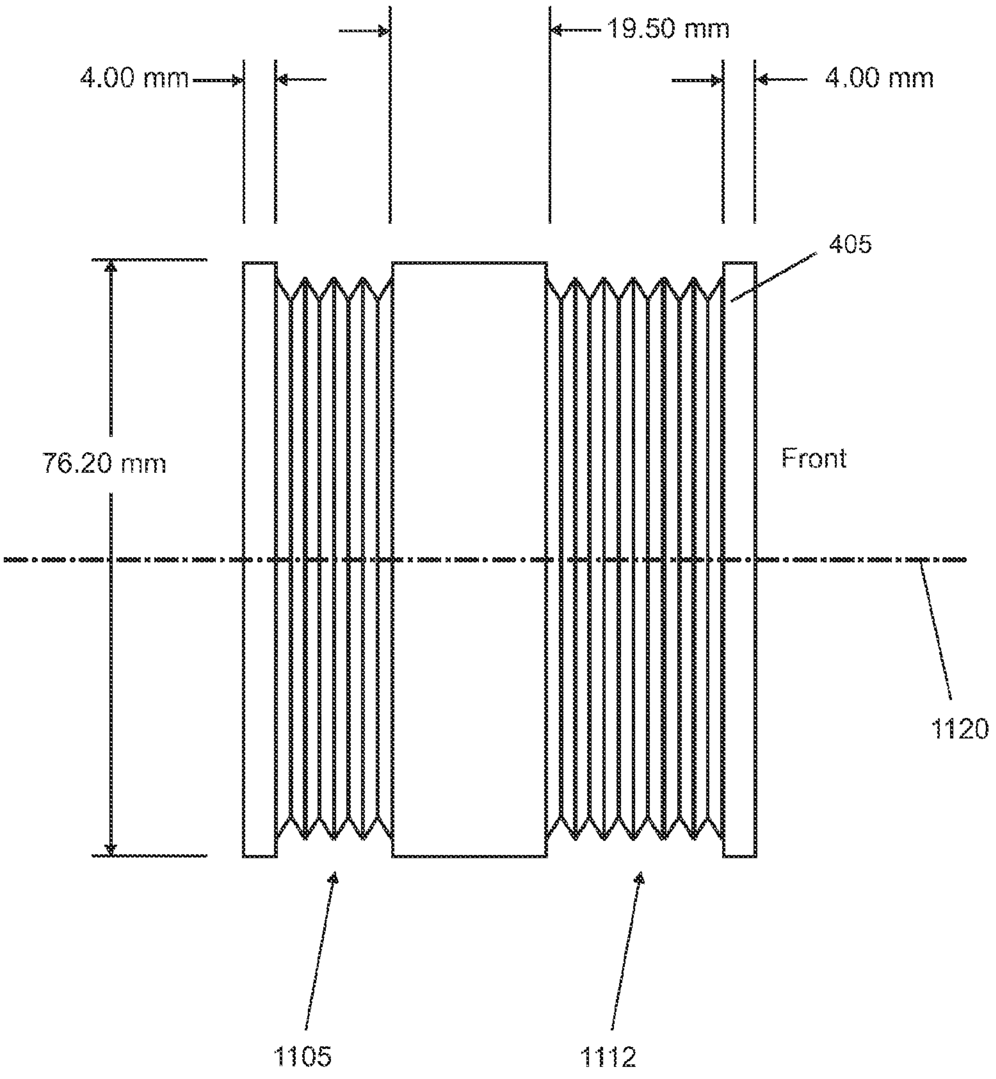
FIG. 11 is a side view of the present flip drive showing the co-axial pulley arrangement.
Figure 12:
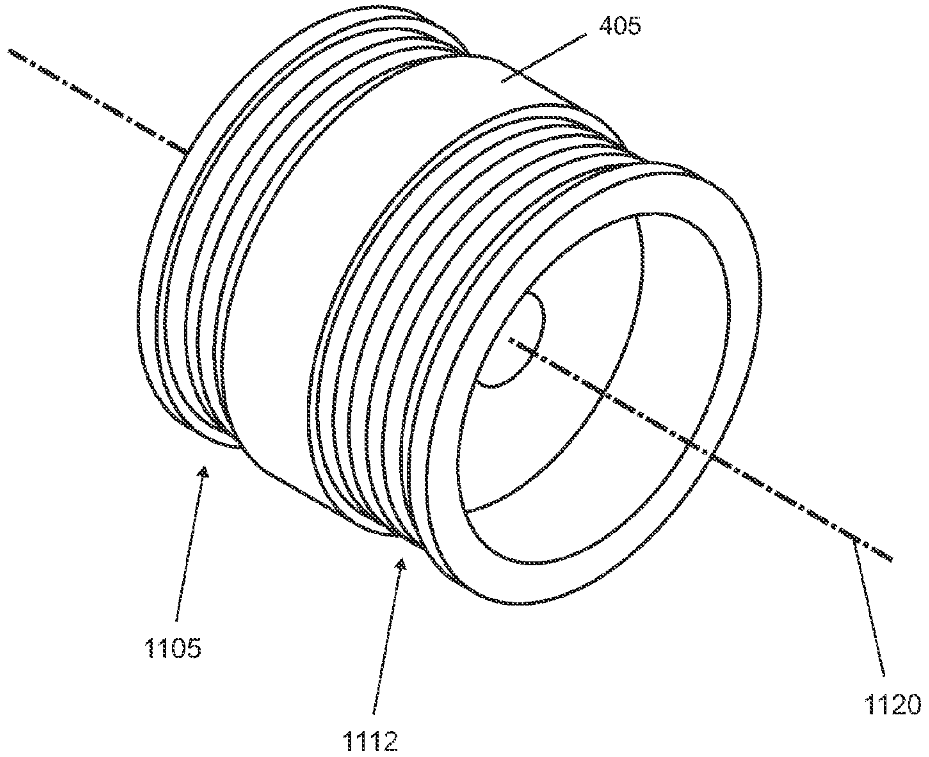
FIG. 12 is an isometric view of the present flip drive.

FIGS. 11 and 12 show respective side and isometric views of the flip drive 405 showing the co-axial pulley arrangement that includes a first pulley 1105 that is arranged to operate in the proximal plane and a second pulley 1112 that operates in the distal plane. In this particular illustrative example, as discussed above, pulley 1105 is grooved to interface with a 4-rib belt (i.e., belt 400) and pulley 1112 is grooved to interface with a 6-rib belt (i.e., belt 600). Pulleys 1105 and 1112 are integrally formed from a single unitary piece of aluminum, in this example, so they are mechanically coupled and rotate about a common axis, as indicated by line 1120 in FIG. 11. Such coupling enables the power applied to the pulley 1105 from belt 400 to be transferred via pulley 1112 to belt 500. In typical applications the pulleys 1105 and 1112 will rotate about an axle assembly (not shown) using conventional pulley bearings or bushings to enable the flip drive to rotate at high speeds with minimal drag and friction.

Figure 13:
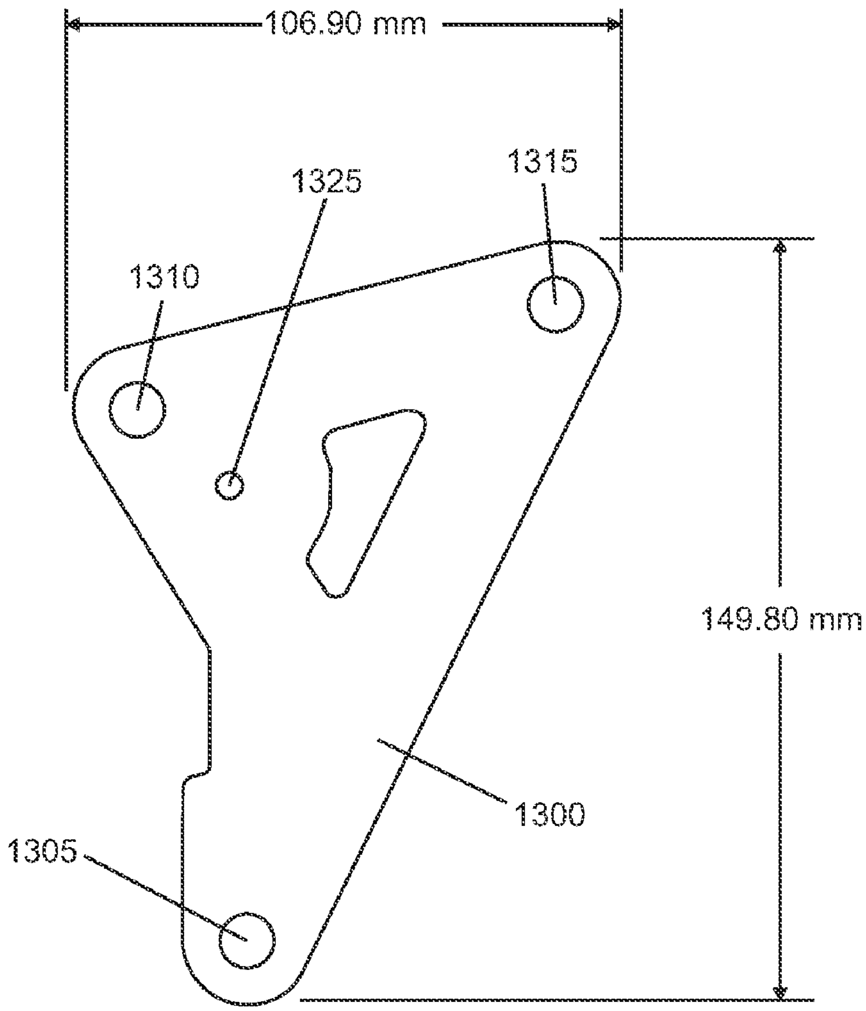
FIG. 13 is a front view of an illustrative flip drive mounting bracket that may be used in some applications to mount the present flip drive to the block of an LS series engine.

FIG. 13 is a front view of an illustrative flip drive mounting bracket 1300 which includes three through holes 1305, 1310, and 1315 through which the three threaded fasteners can pass. Hole 1325 is tapped, for example using a machining operation, to allow the mounting axle of the flip drive 405 to be threadedly engaged so that the flip drive will extend orthogonally from the plane of the bracket 1300. The mounting bracket 1300, in turn, is fixedly attached to the block 800 through holes 1305, 1310, and 1315 using threaded fasteners which engage with three existing threaded holes in the front of the LS engine. Hole 1305 is also used to locate the idler 410.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for driving a supercharger and engine accessories that are coupled to an internal combustion engine and driven by belt drives, the method comprising the steps of:

mounting a belt drive pulley system to the engine, the belt drive pulley system including a plurality of pulleys being interfaced with respective ones of the belt drives, the plurality of said pulleys being co-axially aligned and coupled to rotate simultaneously about an axle that is fixedly coupled to the engine, wherein a first pulley in the plurality of said pulleys takes power from a crankshaft pulley of the engine through a first belt drive operating in a proximal plane, the proximal plane being vertically oriented with respect to the engine, wherein a second pulley in the plurality of said pulleys transfers the power to a second belt drive operating in a distal plane to drive the engine accessories, the distal plane being vertically oriented with respect to the engine, and wherein the proximal and distal planes are non-co-planar, the proximal plane being closest to the engine relative to the distal plane and the distal plane being furthest from the engine relative to the proximal plane; and configuring a third belt drive operating in the distal plane to drive only the supercharger and water pump from the crankshaft pulley but no other engine accessories so that the belt path length of the third belt drive is minimized.

2. The method of claim 1 including a further step of optimizing the configuration of the third belt drive through increasing belt wrap around either the crankshaft pulley or the supercharger pulley.

3. The method of claim 1 in which the first belt drive at least drives an engine accessory comprising an AC compressor.

4. The method of claim 1 in which the second belt drive at least drives engine accessories comprising a power steering pump and an alternator.

5. The method of claim 1 in which the axle is oriented substantially parallel to the longitudinal axis of the crankshaft.

* * * * *